(No Model.) 10 Sheets—Sheet 3.

G. M. HATHAWAY.
MATCH MAKING MACHINE.

No. 559,525. Patented May 5, 1896.

Witnesses
D. Paudert
J. H. Smith

Inventor
George M. Hathaway
By Chas. E. Barker
Attorney (No Model.) 10 Sheets—Sheet 6.

G. M. HATHAWAY.
MATCH MAKING MACHINE.

No. 559,525. Patented May 5, 1896.

Witnesses
D. Paudert
J. H. Smith

Inventor
George M. Hathaway
By Chas. E. Barber
Attorney (No Model.) 10 Sheets—Sheet 8.
G. M. HATHAWAY.
MATCH MAKING MACHINE.
No. 559,525. Patented May 5, 1896.
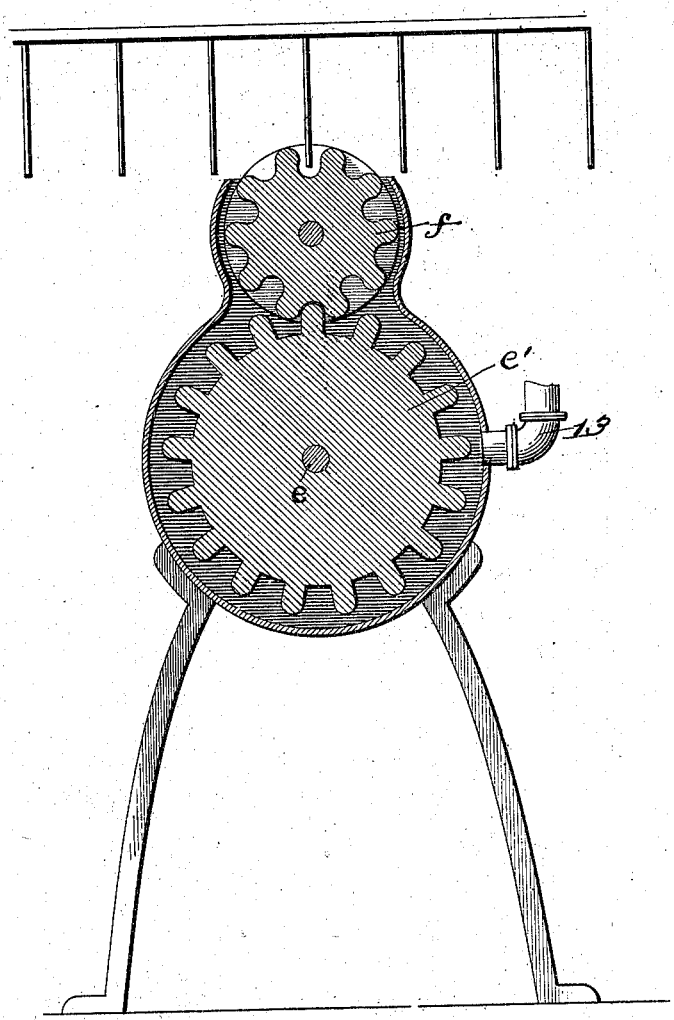
Fig. 8.
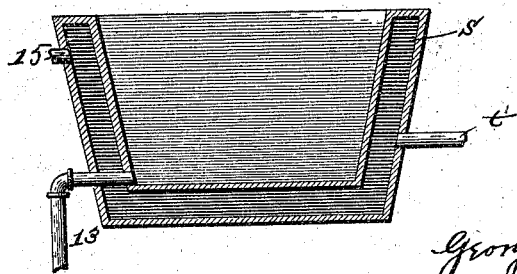
Fig. 8ª.
Witnesses
D. Poudert
J. H. Smith
Inventor
George M. Hathaway
By Chas. E. Barber
Attorney (No Model.)　　　　G. M. HATHAWAY.　　10 Sheets—Sheet 9.
MATCH MAKING MACHINE.

No. 559,525.　　　　　　　　　　Patented May 5, 1896.

Witnesses
D. Paudrit
J. H. Smith

George M. Hathaway
Inventor
By Chas. E. Barber
Attorney (No Model.)
10 Sheets—Sheet 10.

G. M. HATHAWAY.
MATCH MAKING MACHINE.

No. 559,525. Patented May 5, 1896.

Witnesses
D. Paudert
J. H. Smith

Inventor
George M. Hathaway
By Chas. E. Barber
Attorney

UNITED STATES PATENT OFFICE.

GEORGE M. HATHAWAY, OF NEW YORK, N. Y.

MATCH-MAKING MACHINE.

SPECIFICATION forming part of Letters Patent No. 559,525, dated May 5, 1896.

Application filed May 7, 1892. Renewed January 15, 1895. Serial No. 535,044. (No model.)

*To all whom it may concern:*

Be it known that I, GEORGE M. HATHAWAY, a citizen of the United States, residing at New York, in the county of New York and State of New York, have invented a new and useful Improvement in Match-Making Machines, of which the following is so full and exact a description as will enable any one skilled in the art to which my invention appertains to make and use the same, reference being had to the accompanying drawings.

My invention relates to improvements in machines for making matches; and it consists in the arrangement and combination of certain novel mechanisms in such a manner that each step of the several steps necessary to make and finish a match shall follow the other in continuous and regular order until the match is completed and ready for boxing.

The principal object of the invention is to provide a machine by means of which a maximum number of perfectly-finished matches may be produced with a minimum expenditure of mechanical as well as physical labor. This object is accomplished by the mechanism illustrated in the accompanying drawings, in which—

Figure 1:
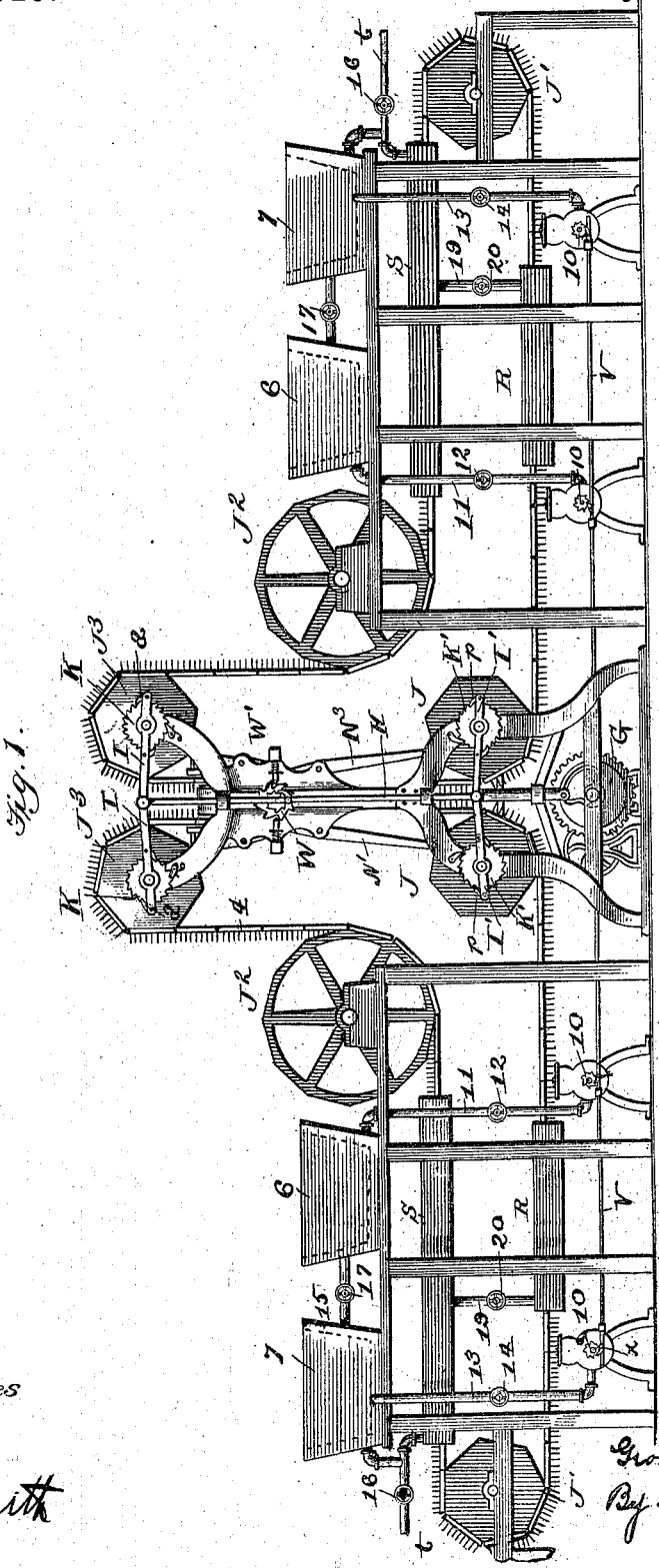
Figure 2:
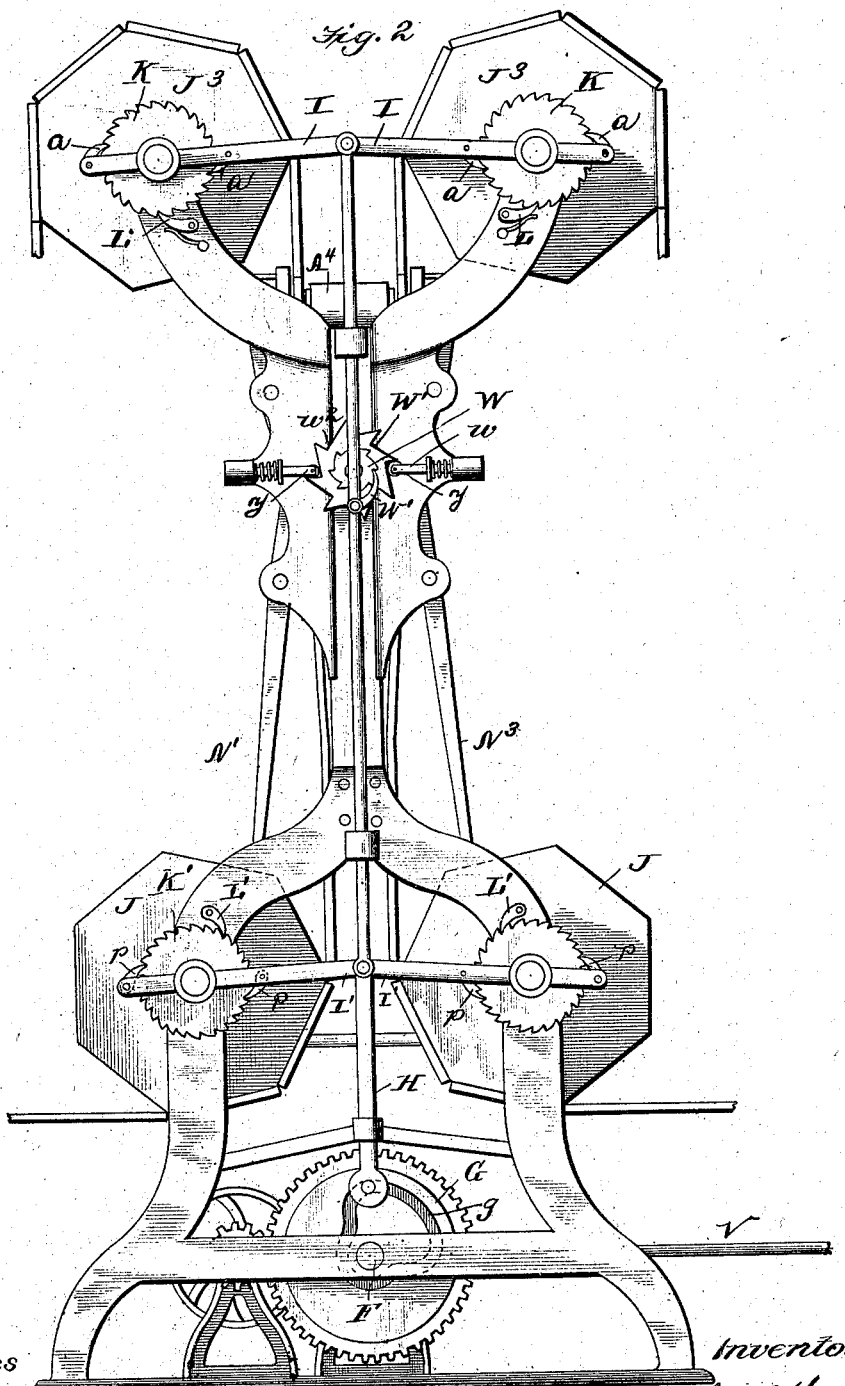
Figure 3:
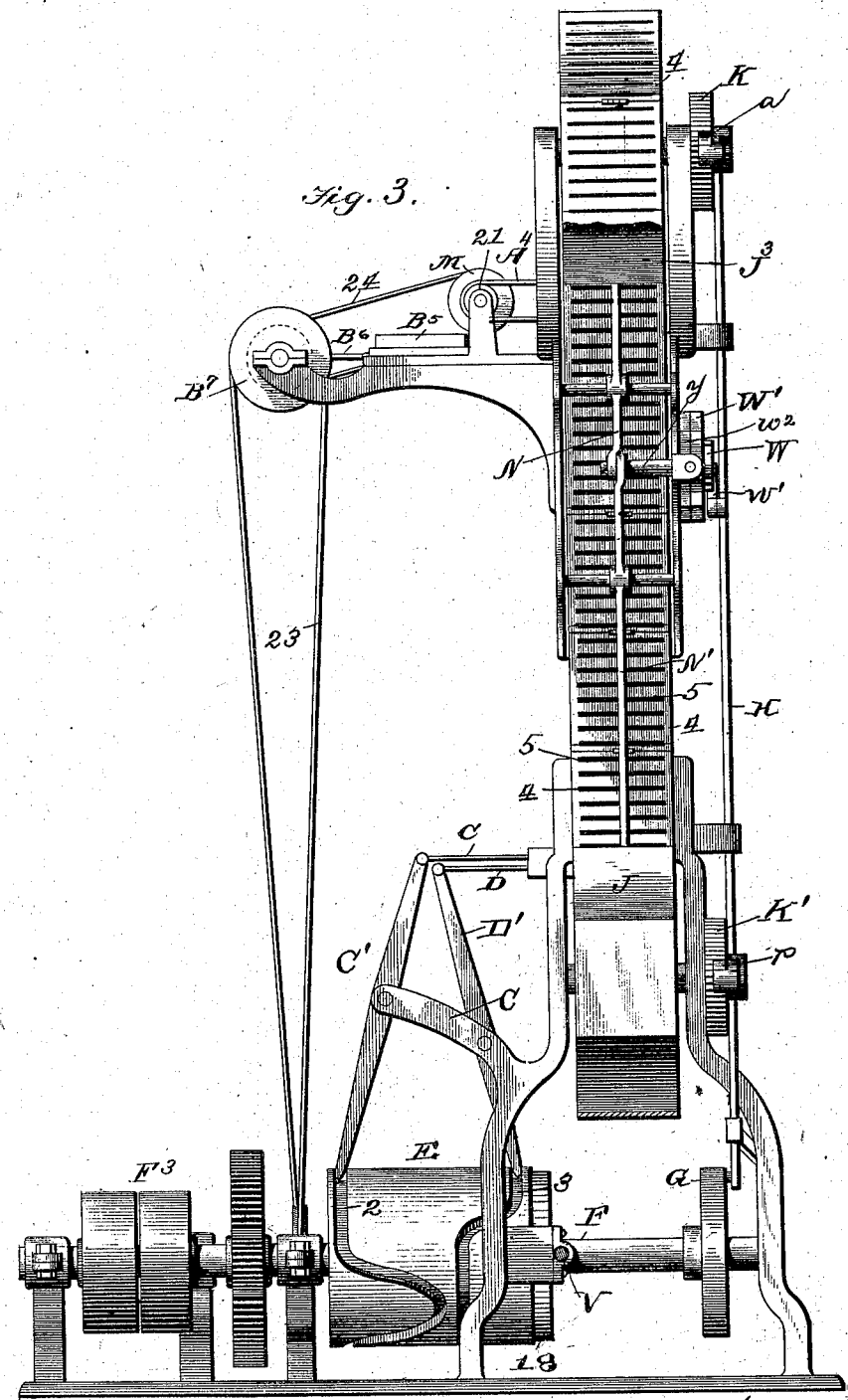
Figure 4:
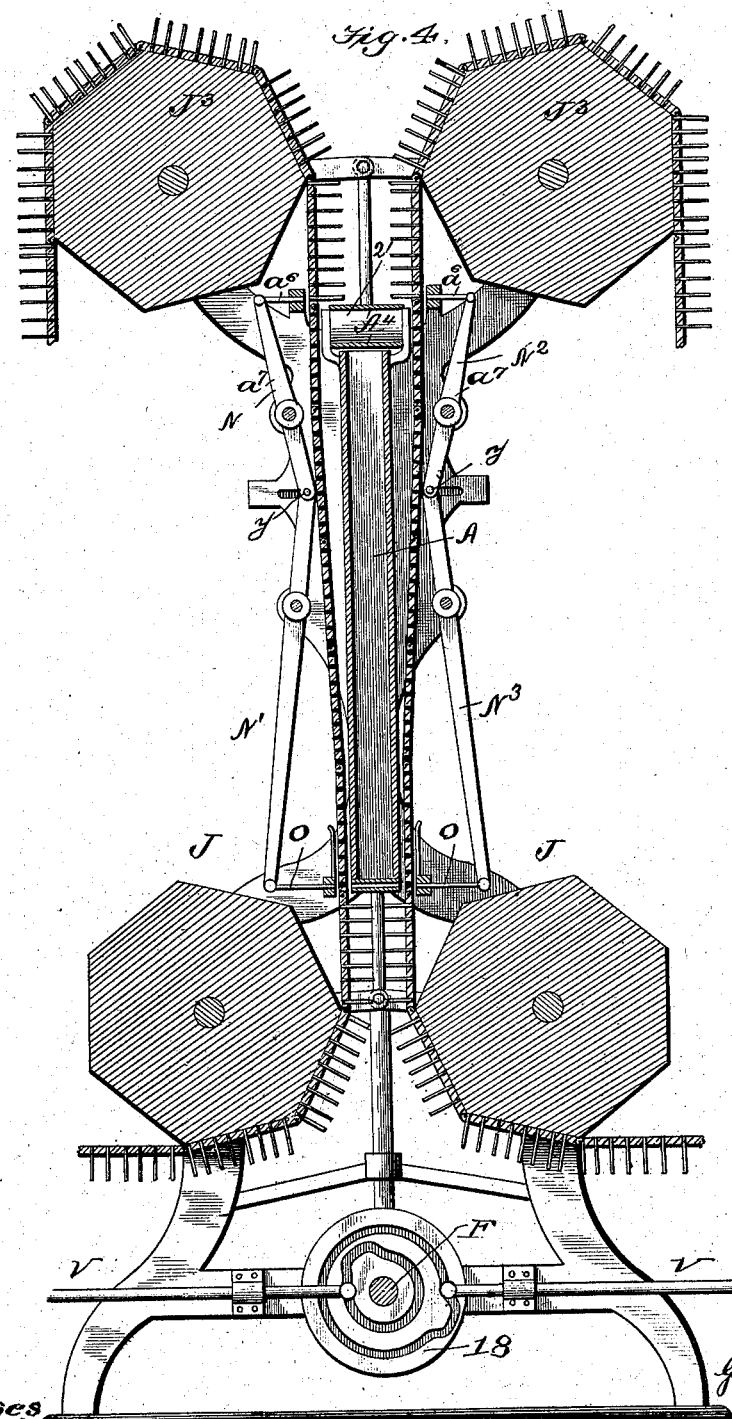
Figure 5:
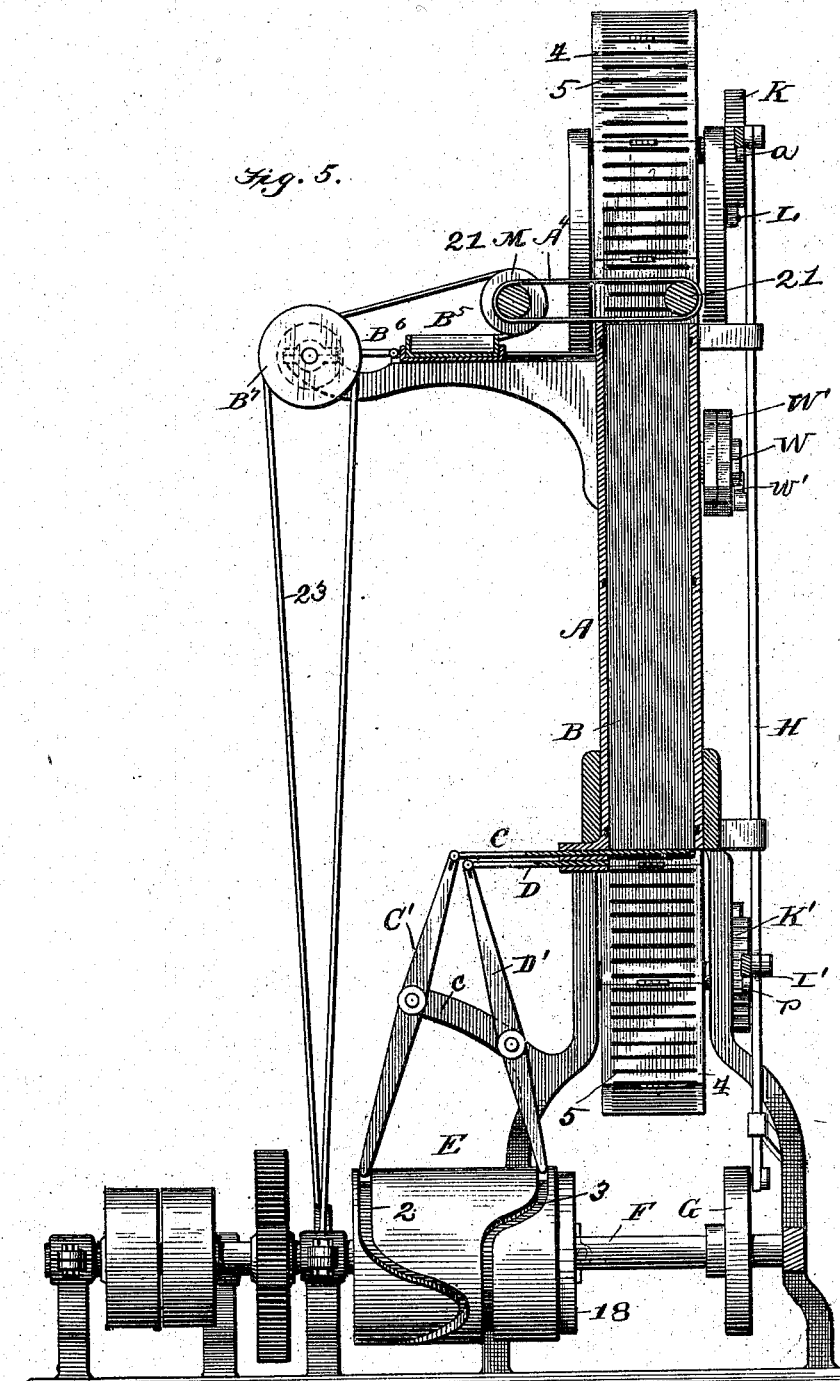
Figure 6:
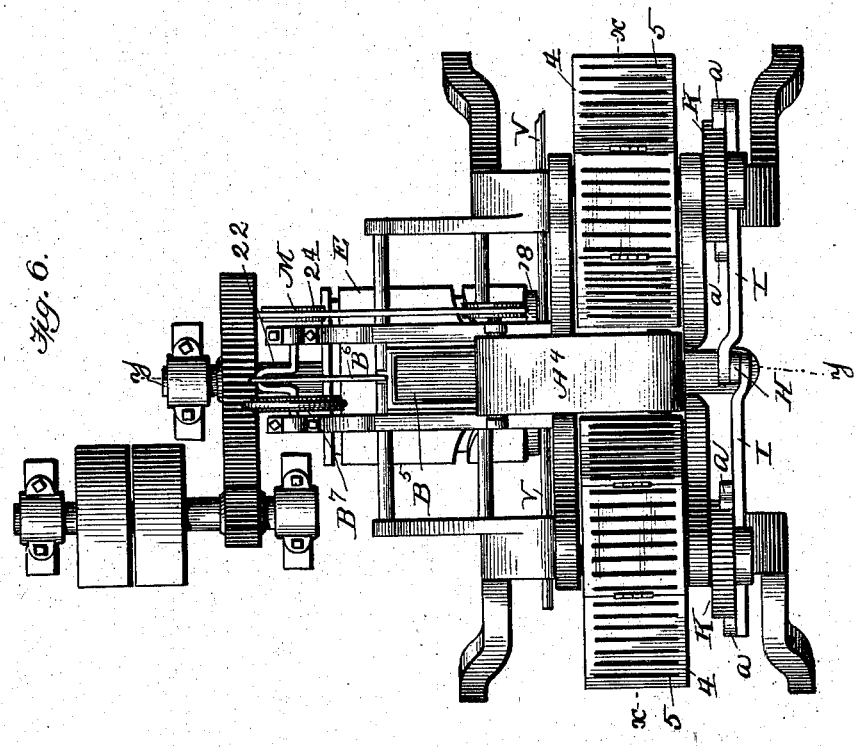
Figure 7:
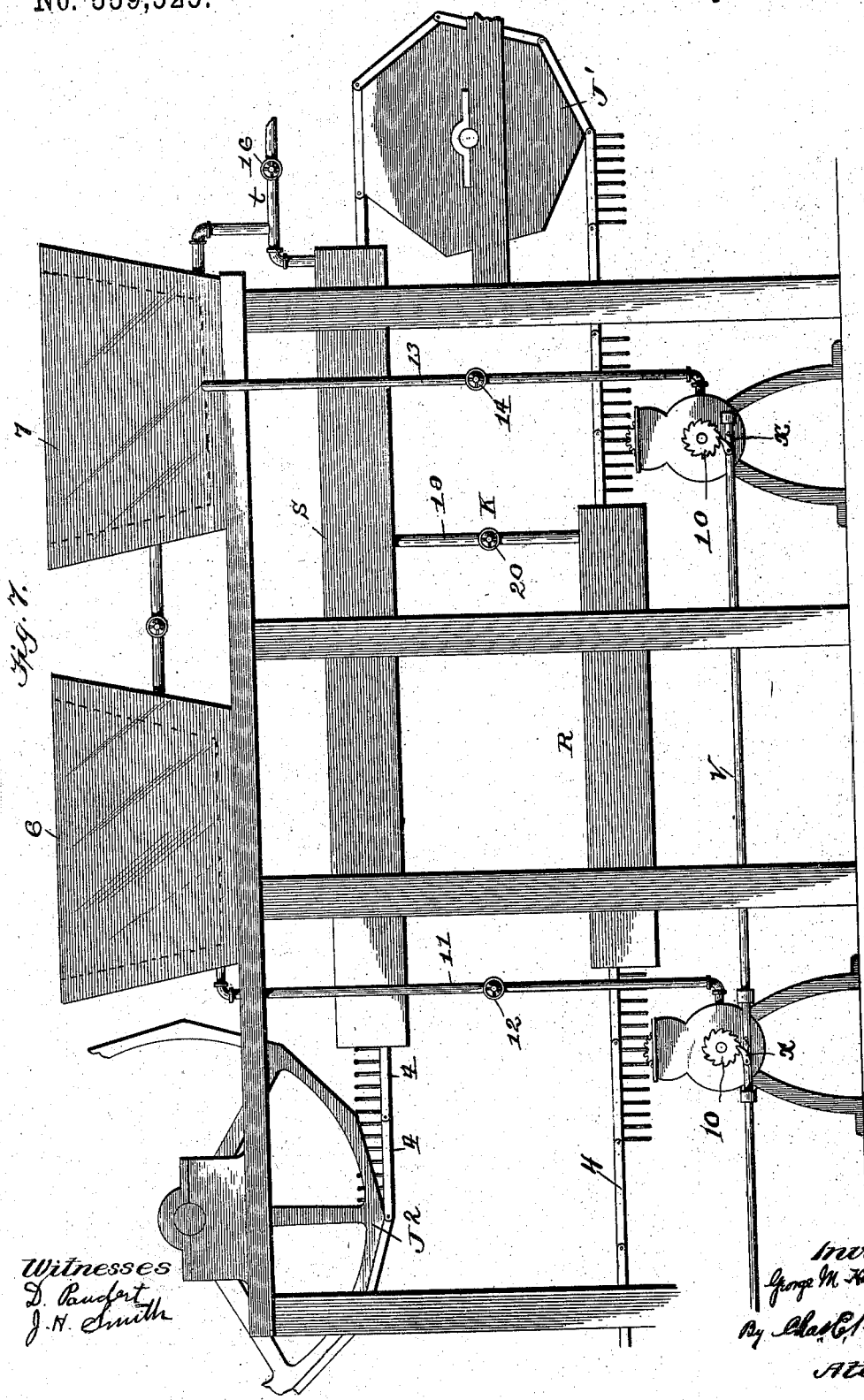
Figure 9:
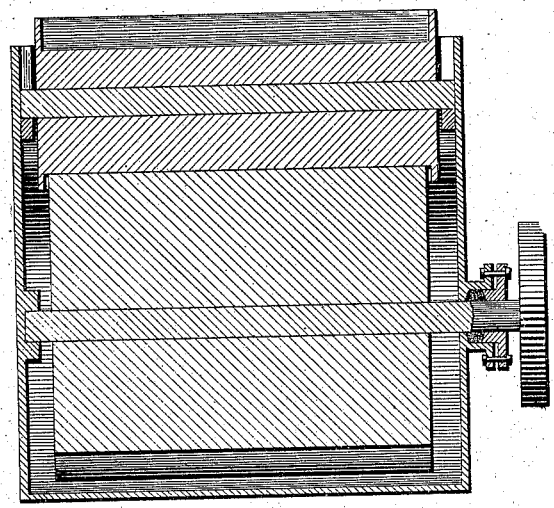
Figure 10:
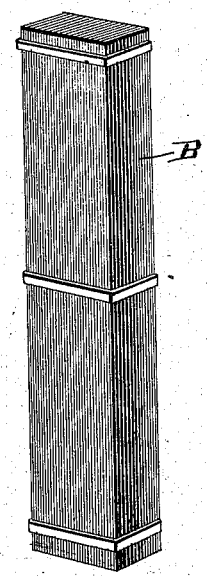
Figure 11:
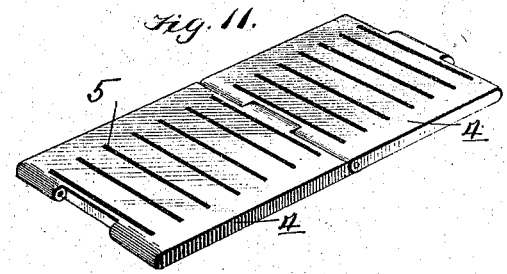
Figure 13:
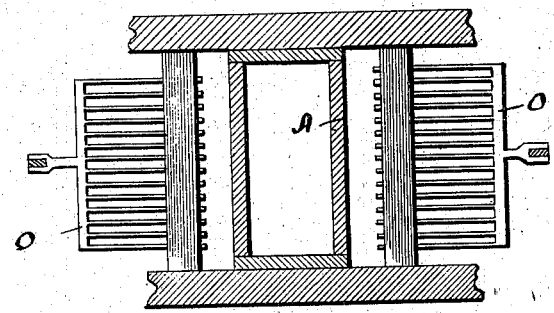
Figure 14:
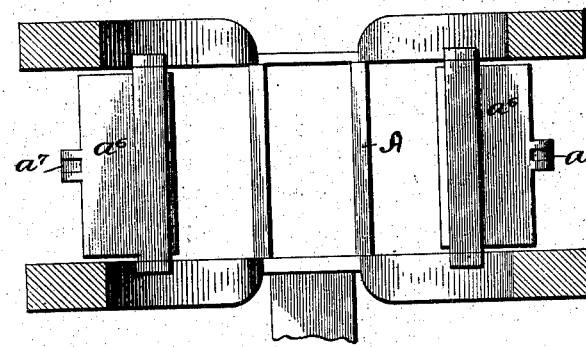

Figure 1 represents a front elevation of my improved machine; Fig. 2, a front elevation of the pushing and ejecting mechanism; Fig. 3, a side elevation of the same, partly in section; Fig. 4, a vertical section through the veneer-receiving tube on the line $x$ $x$ of Fig. 6; Fig. 5, a side elevation, similar to Fig. 3, partly in section, on the line $y$ $y$ of Fig. 6; Fig. 6, a top plan view of the cutting, pushing, and ejecting mechanism; Fig. 7, an enlarged front elevation of the dipping and drying apparatus and the supports therefor; Fig. 8, a vertical cross-section of one of the dipping-receptacles; Fig. $8^a$, a longitudinal vertical section of one of the supply-receptacles; Fig. 9, a longitudinal vertical section of one of the dipping-receptacles; Fig. 10, a perspective view of a bunch of veneers; Fig. 11, a detail perspective of a section of the match-carrying belt; Fig. 12, details of a portion of one of the plates forming the match-carrying belt, showing the interior formation of the match-receiving slots; Fig. 13, a detail plan of the forks for pushing the matches simultaneously in opposite directions into the slots in the belt, and Fig. 14 a plan of the ejectors for forcing the matches out of the slot in the belt.

For convenience in hereinafter referring to the several mechanisms which go to make up the whole of my invention I will proceed to describe it under the following heads, viz:

*Mechanism for cutting the match-splints.—* A indicates a magazine for receiving the veneers B, which are of a uniform thickness, suitable, when cut, to form a match-splint of proper size. These veneers are made into bundles and the bundles placed endwise, one on top of another, in the magazine. Located beneath the magazine in suitable guides is a cutter C, operated by a lever C', pivoted on an arm $c$ of the frame of the machine. Immediately beneath the cutter is a slide-support D, operated by a lever D', also pivoted on the arm $c$. The free end of each of these levers works in cam-slots 2 and 3, respectively, made in a wheel E, mounted on a shaft F, journaled in suitable bearings made in the main frame of the machine. The cutter serves alternately with the slide to support the veneers. As the shaft F is rotated the lever C' is caused by the cam-groove 2 to withdraw the cutter from beneath the veneers. At the same time the lever D' is caused by the cam-groove 3 to force forward the slide D. The withdrawal of the cutter permits the veneers to drop down upon the slide in position to be operated upon by the cutter to cut the match-splints. The shaft continuing to revolve, the lever C is caused by the peculiar action of the cam-groove 2 to force forward the cutter, cutting a row of match-splints. During the cutting operation the slide-support remains stationary, supporting the match-splints. This non-action upon the part of the slide-support is due to the straight part of cam-groove 3, which permits the lever D' to remain at rest during the cutting operation and also during the operation of pushing the matches into the slots in the carrying-belt, as will be hereinafter described.

*Endless belt for holding and carrying the match-splints and the supports therefor.—* Mounted upon suitable shafts journaled in bearings made in the main and other parts of the machine are two sets of polygonal drums, four in each set, J J' J² J³, a match-carrying belt passing over each set. These belts are properly supported at intervals and are composed of hinged plates 4, provided with transverse slots 5, to receive the ends of the matches when pushed into them by the push-forks, as will be presently described. The slots 5 are formed with inwardly-tapering sides which are serrated to insure a more rigid holding of the match, as shown in Fig. 12.

*Mechanism for pushing the match-splints into the slotted belt, means for ejecting the finished matches from said belt, and means for operating the drums.*—Mounted in suitable bearings on the main frame of the machine is a pitman H, to the upper end of which is connected one end each of two ratchet-levers I I, each journaled on the shaft of the respective drums $J^3$ and provided with pawls $a\ a$. A ratchet-wheel K is mounted on each drum shaft and keyed thereto between the drum and ratchet-lever, and spring-actuated pawls L L serve to prevent reverse movement of the ratchet-wheels and consequently the drums $J^3\ J^3$. Journaled on the end of the shaft of each of the drums J is a ratchet-lever I', provided with pawls $p\ p$. Mounted on each drum-shaft and keyed thereto is a ratchet-wheel K', provided with a pawl L', serving to prevent reverse movement of the ratchet-wheel and drum. Pivoted on the main frame of the machine are two ratchet-wheels W W', a small and large one, rigidly fastened together, the smaller one W' being engaged by a spring-actuated pawl $w'$, pivoted on the pitman-rod. On opposite sides of the ratchet-wheel W and adapted to engage therewith is a spring-actuated rod $w^2$, provided with a pin $y$, which, passing through, operates in a slot made in the main frame of the machine, Fig. 4. Fulcrumed to the main frame on the side opposite to that on which are located the ratchet-wheels and spring-actuated rods are two sets of levers N N' and $N^2\ N^3$, with the adjacent ends of each set pivoted on the pins $y$, respectively, of the spring-actuated rods. To the lower end of each lever N' and $N^3$ is attached a reciprocating push-fork O, operating in suitable guides toward and from each other, and at right angles to the movement of the cutter and support and to the upper end of each lever N and $N^2$ is attached an ejector $a^6$, operating in suitable guides. The lower end of the pitman-rod is provided with a projection which operates in a cam-groove $g$, made in one side of a wheel G, mounted on the shaft F.

The operation of the several mechanisms is as follows: After the match-splints have been cut and before the cutter and slide support D have been withdrawn the cam-wheel G, revolving on the shaft F, causes the pitman-rod to ascend, and as the pawl $w'$ is pivoted on said rod the said pawl, acting on a tooth of the ratchet-wheel W', will cause it, together with the ratchet-wheel W, to turn one notch. In the act of turning, each of the spring-actuated rods $w^2$ will be forced outward by a tooth of the ratchet-wheel W, and in the outward movement of said rods $w^2$ the connected ends of the two sets of levers pivoted on the pins $y$, respectively, will also move outward, and as the said levers are fulcrumed at a point between their respective ends it will be apparent that the upper and lower ends of each set of levers will move inward as the connected ends move outward. The inward movement of the ends of the levers N' and $N^3$ forces forward the push-forks attached thereto, the tines of one fork pushing each alternate match-splint into the slot of that portion of the belt opposite said fork-tines and at the same time the tines of the other fork are pushing the other alternate match-splints into the slot in that portion of the belt opposite to the tines of that fork. Simultaneously with the inward movement of the push-forks the ejectors are forced forward by the inward movement of the ends of levers N and $N^2$ to eject the finished matches, if any there be, from the slot in each side of the belt onto a traveling belt $A^4$, which conveys them to a receptacle $B^5$. As soon as the match-splints have been pushed into the slots in the belt and the finished matches ejected therefrom the pitman is caused to descend by the action of the cam-wheel G and depress the connected ends of each set of ratchet-levers I I to operate their respective ratchet-wheels by means of the pawls $a\ a$ and $p\ p$ to turn the drums and move the belt one notch.

*The frame for supporting the supply-tanks containing paraffin and igniting composition and the drying apparatus.*—The machine which I have illustrated in the accompanying drawings is a double one—that is to say, there are two endless match-carrying belts, two sets of belt-drums, two sets of paraffin and igniting-composition tanks, two sets of dipping and drying apparatus, and supports for the same.

At each side of the main frame supporting the several mechanisms heretofore described is a suitable framework, upon which is supported a paraffin-tank 6 and an igniting-composition-supply tank 7.

8 and 9 indicate the respective sets of dipping-vessels.

R and S respectively indicate the drying-boxes, which are secured to the uprights of the frames and aid in strengthening the same.

*The supply-tanks, dipping-vessels, and their respective connections.*—The paraffin-tanks are located one on each side of a drum $J^2$, and the tanks containing the igniting composition are located one at the right and left of the respective paraffin-tanks. These tanks are "jacketed" to form a steam-space $s$, as shown in Fig. $8^a$. The main body of the vessels in which the match-splints are dipped to receive the paraffin coating and the igniting composition are cylindrical in form, with the sides curving upward, the ends closed, and top open. Journaled in the ends of the main body of each dipping vessel is a shaft $e$, on which is mounted a cog-wheel or cylinder $e'$. (See Fig. 8.) One end of each shaft extends through one end of its respective vessel and is provided with a suitable stuffing-box and a ratchet-wheel 10, the purpose of which will presently appear. In the upper part of the vessel is loosely journaled a longitudinally-grooved cylinder $f$, adapted to mesh with the cog-wheel or cylinder $e$. It will be observed that each alternate groove in the cylinder $f$ is somewhat deeper than the other, so that when it is rotated by the cog-wheel or cylinder $e'$ it will be given a rising-and-falling motion. Each paraffin-supply tank is connected with its dipping vessel by a pipe 11, fitted with a cut-off cock 12, and each igniting-composition-supply tank is connected with its dipping vessel by a pipe 13, fitted with a cut-off cock 14. A steam-pipe $t$, leading from a supply-pipe which receives its supply of steam from any suitable source, enters the steam-space of each igniting-composition tank, and a pipe 15 connects the steam-space of said tank with that of the paraffin-tank. The supply and connecting pipes are each fitted with cut-off cocks 16 and 17, respectively. Reciprocating rods V, mounted in suitable bearings fixed upon the respective dipping vessels and main frame of the machine, connect each set of vessels with a cam-wheel 18, mounted on the shaft F. The shafts are provided with pawls $x\ x$, which engage the ratchet-wheels on the shafts of the respective dipping vessels. As the cam-wheel is rotated the rods V are caused to reciprocate, and on each forward movement of the same the pawls push the ratchet-wheels around, causing the cog-wheel or cylinder $e'$ to rotate the grooved cylinder to the extent of two cogs, said cylinder being so arranged that the deeper groove will always be presented with the paraffin or igniting composition to the match-splint. The cog-wheels or cylinders in their revolutions keep the contents of the vessels in a constant state of agitation, so that the material is maintained to an even consistency.

The dipping mechanism just above described forms part of the subject-matter of an application for Letters Patent filed by me July 26, 1892, Serial No. 441,298, and is therein claimed. Hence no claim is made to said mechanism in the present application.

*The drying mechanism.*—Each drying-box is constructed with a suitable steam-space, provision being made for both the admission and the escape of the steam. The drying-boxes S are located directly under the supply-tanks, and the drying-boxes R are located under the boxes S and at a suitable distance from the paraffin-dipping vessel. Steam is received into the steam-space of each drying-box S from the supply-pipe $t$, and a pipe 19, fitted with a cut-off cock 20, connects the steam-space of the box S with that of the box R.

*The apron for conveying the finished matches to the receiving-box and the mechanism for operating said box.*—An endless apron $A^4$, running on rollers 21, is located immediately below the ejectors for ejecting the finished matches, and a receiving-box $B^5$ is arranged at the outer end of the endless apron, just below the same. The receiving-box is reciprocated by a pitman $B^6$, operated by a crank 22, on the inside of the wheel $B^7$, which is driven by a belt 23 from a driving-pulley mounted on the shaft F. A belt 24, running over a pulley mounted on the outer apron-roller and a pulley on the shaft of the wheel $B^7$, serves to drive the rollers carrying the endless apron.

From the foregoing description it will be necessary to describe the operation of the machine only in a general way, which is as follows: Power being applied to the main shaft F through the medium of the pulley mounted thereon, the cam-wheel E imparts motion to the levers C' D', which operates the cutter and slide-support, respectively. As the cut is being made an upward movement is being given the pitman H, which, on its descent, imparts motion to the two sets of ratchet-levers and their pawls to operate the drums J and $J^3$ and cause the same to turn one notch, feeding the belts downward the same distance. At the same time the ratchet-wheel W, by means of the pawl $w'$ and ratchet-wheel $W'$, forces the spring-actuated rods outward, thereby imparting motion to the two sets of levers N N' and $N^2\ N^3$, which operate the push-forks to insert the match-splints into the slots in the belts and the ejectors to eject the finished matches onto the apron. After the match-splints have been inserted into the slots in the belts, the latter are fed step by step as the cutting continues to the paraffin-dipping vessel, where the matches are properly coated with paraffin; thence are conveyed by the same step-by-step movement to the drying-boxes R, through which they pass; thence to the composition vessel, where the matches receive the igniting composition, up over drums $J^2$ and through the drying-boxes S; thence around drums $J^3$ to the ejector mechanism, where they are ejected, as before stated, onto the traveling apron and discharged into the receiving-boxes.

It will be apparent that the double machine will produce matches very rapidly, and, at the same time, perfectly, each match being free from ragged edges and the usual irregular coating of the igniting composition, as by my manner of applying the composition by a straight upward movement I am enabled to deposit just the required amount in a regular and uniform manner. Each match being separated from its neighbor, when the composition is applied they do not stick together.

I do not wish to be understood as limiting myself to the exact constructions and arrangements of the several mechanisms, as they may be varied almost indefinitely without departing from the spirit of my invention or sacrificing the principle thereof.

Having thus fully described my invention, what I claim as new, and desire to secure by Letters Patent, is—

1. In a machine for making matches, the combination, with a magazine for holding veneers, of a reciprocating cutter, located beneath the magazine, a reciprocating support for the match-splints, the driving cam-wheel having cam-grooves which actuate the reciprocating cutter and reciprocating support, a suitably-supported traveling belt composed of a series of plates hinged together and slotted to receive the ends of the match-splints, a splint-pushing mechanism, the operating-levers, and mechanism whereby motion is imparted to the same, substantially as specified.

2. In a machine for making matches, the combination of a magazine for holding veneers, a reciprocating cutter mechanism, a reciprocating match-splint support, the cutter and support operating levers a driving cam-wheel having cam-grooves which actuate said levers, and a push-fork operating between said cutter and support at right angles to the movement of the same, substantially as specified.

3. The combination, with the reciprocating cutter and a reciprocating match-splint support, of two push-forks moving in opposite directions, between said cutter and support, to insert the splints into the slots in two belts at opposite sides of the machine, at one and the same operation, and the two belts supported by and traveling over drums, substantially as specified.

4. In a continuous match-making machine, with an endless belt and supporting-drums therefor, of a pitman-rod the cam-wheel mounted on the driving-shaft, a ratchet mechanism operated by a pawl attached to said rod, spring-actuated rods operated by the ratchet mechanism, and two sets of fulcrumed levers, one set carrying push-forks, and the other ejectors, said levers operated by the spring-actuated rods, substantially as specified.

5. The combination of the veneer-magazine, the reciprocating cutter, the reciprocating support, each reciprocated by a separate lever actuated by a separate cam-groove formed in a driving-wheel, a push-fork reciprocating between said cutter and support, and a conveyer-belt provided with transverse serrated slots, substantially as specified.

6. The combination, with the veneer-magazine, the reciprocating cutter, the reciprocating support, a separate lever for reciprocating each the cutter and support, a driving-wheel having a cam-groove for actuating each lever, of two push-forks operating in opposite directions and at right angles to the movement of said cutter and support, and two conveyer-belts provided with transverse slots tapered in opposite directions and having serrated holding-surfaces, substantially as specified.

7. The combination, with a single magazine for holding the veneers, a single cutter mechanism and splint-support, of two endless slotted belts suitably supported and arranged to travel at opposite sides of the veneer-magazine, and two splint-inserting mechanisms, substantially as specified.

8. The combination, with a single magazine for holding the veneers, a single cutter mechanism and splint-support, of two endless slotted belts supported on rotating drums, two splint-inserting mechanisms located at opposite sides of the magazine, and two ejector mechanisms, substantially as specified.

9. The combination, with a single magazine for holding the veneers, a single cutter mechanism and splint-support, of two slotted endless belts supported by rotating drums, two match-inserting mechanisms, two ejector mechanisms, two sets of paraffining vessels, two sets of mechanisms for applying the igniting composition, and two sets of drying-boxes, the respective sets of belts and their supports, splint-inserting mechanism, ejector mechanism, paraffining vessels, applying vessels and drying-boxes being located on opposite sides of the magazine, substantially as described and specified.

10. The combination, with a single magazine, a single cutting mechanism and splint-support, of splint-sticking mechanisms located at opposite sides of said magazine and arranged to push a row of alternate splints in opposite directions, and a slotted conveyer-belt for each splint-sticking mechanism, and separate mechanism for moving each belt, substantially as specified.

11. In a continuous match-making machine the combination with a single veneer-magazine, and the splint cutting and sticking mechanism located below the same, of the polygonal drums, in two sets located respectively at opposite sides of the magazine and the splint cutting and sticking mechanism, and the mechanism for imparting a step-by-step movement to the belt, and mechanism for operating the cutter and pushing-forks, to cut and insert the splints in the plates of the respective belts, substantially as specified.

12. In a match-making machine the combination with a single veneer-magazine the polygonal drums located at opposite sides thereof, and the conveyer-belts, of the pitman located between the respective sets of drums, the ratchet-levers mounted on the shafts of the drums, and pivoted to the said pitman, and pawls pivoted to the said levers and adapted to engage and move the ratchet-wheels, and the stop-pawls, also engaging said ratchet-wheels, to prevent reverse movement, the whole arranged to impart a step-by-step movement to the belts in one direction, substantially as specified.

13. The combination in a match-making machine, of a single veneer-magazine of a single cutting mechanism and splint-support, of splint-sticking mechanism located at opposite sides of the magazine and adapted to work at right angles to the cutting mechanism, and mechanism for operating the cutting and sticking mechanism to cut the splints from the veneer bundle, the conveyer-belts, and mechanism for inserting the splints into the same, substantially as specified.

In testimony whereof I affix my signature in the presence of two witnesses.

GEORGE M. HATHAWAY.

Witnesses:
D. G. STUART,
CHAS. E. BARBER.